(12) United States Patent
Pearson (10) Patent No.: US 8,646,474 B2
(45) Date of Patent: Feb. 11, 2014

(54) AUTOMATED CONDENSATE DRAIN LINE CLEANING SYSTEM, METHOD AND KIT

(75) Inventor: Steven L. Pearson, Austin, TX (US)

(73) Assignee: Visionex Holdings, LLC, Austin, TX (US)

( * ) Notice: Subject to any disclaimer, the term of this patent is extended or adjusted under 35 U.S.C. 154(b) by 435 days.

(21) Appl. No.: 12/951,987

(22) Filed: Nov. 22, 2010

(65) Prior Publication Data

US 2011/0061745 A1 Mar. 17, 2011

Related U.S. Application Data

(62) Division of application No. 12/006,325, filed on Dec. 31, 2007, now Pat. No. 7,857,004.

(51) Int. Cl.
*B08B 3/00* (2006.01)

(52) U.S. Cl.
USPC ........................ 137/15.04; 137/240

(58) Field of Classification Search
USPC ............... 137/1, 624.11, 624.12, 204, 15.04, 137/15.05, 488, 240, 238
See application file for complete search history.

(56) References Cited

U.S. PATENT DOCUMENTS

| | | |
|---|---|---|
| 3,048,186 A | 8/1962 | Roberts |
| 3,411,225 A | 11/1968 | Barras |
| 4,063,317 A | 12/1977 | Santore |
| 4,937,559 A | 6/1990 | Meacham et al. |
| 4,962,778 A | 10/1990 | Driskill |
| 5,069,042 A | 12/1991 | Stuchlik, III |
| 5,151,685 A | 9/1992 | Spicer et al. |
| 5,271,237 A * | 12/1993 | Popelka et al. ............... 137/112 |
| 5,293,894 A * | 3/1994 | Fleischmann ............... 137/135 |
| 5,366,004 A | 11/1994 | Garner et al. |
| 5,416,947 A | 5/1995 | Jaffe |
| 5,837,147 A | 11/1998 | Joung |
| 6,024,112 A * | 2/2000 | Cornwell ............... 137/204 |
| 6,041,611 A | 3/2000 | Palmer |
| 6,146,524 A | 11/2000 | Story |
| 6,229,229 B1 | 5/2001 | Sharp |
| 6,321,773 B1 | 11/2001 | Ramsby |
| 6,427,458 B1 | 8/2002 | Fowler |

(Continued)

FOREIGN PATENT DOCUMENTS

WO WO 2012/110800 8/2012

OTHER PUBLICATIONS apc.com, "NetworkAIR PA 1000 Installation (User's Manual)", http://www.apcmedia.com/salestools/ASTE-6Z2RQ6__R0__EN.pdf, (Apr. 2001), 28 pages.

(Continued)

*Primary Examiner* — Kevin Lee
(74) *Attorney, Agent, or Firm* — Blakely Sokoloff Taylor & Zafman LLP (57) ABSTRACT

Automated condensate drain line cleaning apparatus are disclosed. In one aspect, an apparatus may include a controller, a fluid supply line, and at least one fluid flow regulation device. The at least one fluid flow regulation device may be electrically coupled with the controller to receive at least one control signal from the controller. The at least one fluid flow regulation device may cause a fluid to flow into a condensate drain line through the fluid supply line responsive to the at least one control signal. Other apparatus as well as methods and kits are also disclosed.

10 Claims, 8 Drawing Sheets

(56) References Cited

U.S. PATENT DOCUMENTS

| | | | |
|---|---|---|---|
| 6,442,955 B1 | 9/2002 | Oakner et al. | |
| 6,442,956 B1 | 9/2002 | Herren | |
| 6,443,173 B1 * | 9/2002 | Thompson, Jr. | 137/1 |
| 6,708,717 B1 | 3/2004 | Coogle | |
| 6,730,865 B1 | 5/2004 | Hernandez-Zelaya | |
| 6,976,367 B2 | 12/2005 | Spanger | |
| 6,992,259 B1 | 1/2006 | Cantolino | |
| 7,010,928 B2 | 3/2006 | Spanger | |
| 7,111,873 B1 | 9/2006 | Coogle | |
| 7,392,658 B1 | 7/2008 | Hardy, III | |
| 7,844,367 B2 * | 11/2010 | Nickerson et al. | 137/624.11 |
| 7,930,898 B2 | 4/2011 | Laufenberg et al. | |
| 2002/0000093 A1 | 1/2002 | Lea | |
| 2002/0157708 A1 | 10/2002 | Goff | |
| 2005/0005625 A1 | 1/2005 | Lee | |
| 2006/0033630 A1 | 2/2006 | Lyall, III | |
| 2006/0042292 A1 | 3/2006 | Kimbrough et al. | |
| 2006/0070658 A1 | 4/2006 | Nakata et al. | |
| 2006/0096307 A1 | 5/2006 | Coogle | |
| 2006/0096638 A1 | 5/2006 | Coogle | |
| 2006/0096639 A1 | 5/2006 | Coogle | |

OTHER PUBLICATIONS

Matsushita Eletrical Co. Ltd., "Room Air Conditioner Operating Instructions", http://service.us.panasonic.com/OPERMANPDF/CSC9CKPG.PDF, (2002), 24 pages.

* cited by examiner

AUTOMATED CONDENSATE
DRAIN LINE CLEANING
METHOD
100

PERFORM AUTOMATED INTRODUCTION
OF FLUID INTO CONDENSATE DRAIN LINE — 102

REMOVE AT LEAST ONE OF MICROBIAL
MATERIAL AND NON-MICROBIAL DEBRIS
FROM CONDENSATE DRAIN LINE BY — 104
FLOWING FLUID THROUGH CONDENSATE
DRAIN LINE

AUTOMATED CONDENSATE DRAIN LINE CLEANING SYSTEM, METHOD AND KIT

The present application is a divisional of U.S. patent application Ser. No. 12/006,325, filed on Dec. 31, 2007, entitled "AUTOMATED CONDENSATE DRAIN LINE CLEANING SYSTEM, METHOD, AND KIT", now U.S. Pat. No. 7,857,004. Application Ser. No. 12/006,325 is hereby incorporated herein by reference.

BACKGROUND

1. Field

Embodiments of the invention relate to air conditioning systems. In particular, embodiments of the invention relate to systems, methods, and kits to clean condensate drain lines of air conditioning systems.

2. Background Information

Air conditioning systems are widely utilized in homes and businesses throughout the world. The air conditioning systems, or air conditioners for short, are used to cool air in order to provide a cool working or living environment.

By way of example, an air conditioner may have an evaporator or evaporator coils that are used to cool the air. In cooling the air, humidity or water vapor in the air may condense on the relatively cooler evaporator coils. This may produce liquid water known as condensation. Generally, the greater the humidity, the greater the amount of condensation produced.

The air conditioner typically includes a primary condensate drain pan situated below the evaporator coils to collect the condensation. When the air conditioner is operating, condensation may form on the evaporator coils, fall from the evaporator coils into the primary condensate drain pan, and accumulate in the condensate drain pan.

The air conditioner typically also includes a condensate drain line. The condensate drain line may be used to drain the condensate from the primary condensate drain pan to a suitable destination, such as, for example, a sewer, an outside location, or the like.

One challenge is that the condensate drain line may tend to become clogged thereby restricting flow of the condensate from the primary condensate drain pan. One potential cause is microbial growth. Bacteria, algae, or other microbial matter may tend to grow within the condensate drain line. Non-microbial debris, such as, for example, dust, dirt, rust, or the like, may also tend to enter the condensate drain line and contribute to restriction of flow.

Generally, the flow rate of the condensate through the condensate drain line is fairly low. Typically, the flow rate of the condensate is insufficient to flush or otherwise remove the microbial matter and/or non-microbial debris from the condensate drain line. Eventually, if actions are not taken, this growth may tend to close off the condensate drain line and prevent further flow of condensate from the condensate drain pan. This may cause the level of condensate in the condensate drain pan to rise.

Some air conditioners have a secondary or backup condensate drain line at a higher level in the condensate drain pan than the aforementioned main condensate drain line. However, this secondary condensate drain line may also become clogged. If the air conditioner doesn't have a secondary condensate drain line, or if the secondary condensate drain line also becomes clogged, the primary condensate drain pan may fill with condensate and at some point the condensate may begin to overflow.

In some cases, this condensate may overflow into the business or residence and may tend to cause significant property damage. For example, the condensate may damage the floors, walls, carpet, and miscellaneous other content within the business or residence. In some cases, the condensate may cause an electrical short. Sometimes such damage may continue to occur unnoticed for days. This tends to be exacerbated by the fact that air conditioners are often deployed in attics, closets, or other out-of-sight locations.

One approach is to have a plumber come out either from time to time or after discovering the condensate overflow and associated damage. The plumber typically disconnects the clogged condensate drain line, and manually removes the microbial matter and/or debris from the condensate drain line (for example with compressed air from a compressed air tank). Potential disadvantages of this approach are not preventing the condensate overflow and associated damage and/or the significant costs of the plumber.

U.S. Patent Application Publication US 2006/0042292 discusses another approach. As discussed in the abstract thereof, currently, there are no products available which allow a user to solely remove microbial and bacterial growth inside a blocked HVAC condensate drain line using compressed air without cutting into or disassembling the drain line. Our valve is an in-line condensate drain line valve that can be installed easily, quickly and economically, either during new construction or onto existing HVAC systems. The HVAC user can remove microbial and bacterial growths without cutting into or disassembling the drain line by injecting compressed air through the valve. The design of our valve allows the user to perform safe and routine maintenance to the HVAC drainage system without having to resort to expensive and repetitive service call repairs over the lifetime of the HVAC system. The valve is further designed to prevent undesirable reverse airflows into the HVAC system and home or building, caused by a dry trap in the condensate drain. The prevention of reverse airflows and reduction of microbial and bacterial growth will have a positive impact of Indoor Air Quality.

U.S. Pat. No. 6,041,611 discusses a system and method for cleaning air conditioning drains. As discussed in the abstract thereof, a system for cleaning-out a condensate drain line is disclosed. The condensate drain line is operatively associated with an air-conditioner that contains an evaporator coil and a primary drain pan. The system comprises a manifold operatively placed in fluid communication with the condensate drain line. The manifold includes a first, second, and third line. In one embodiment, the first line extends from the manifold, and the second and third line are axially aligned with the condensate drain line. The system further includes a first valve member disposed within the first line, a second valve member disposed within the second line, and a third valve member disposed within the third line. A water stream, which is operatively connected with the first line, is provided so that the water stream may be channeled through the manifold and into the condensate drain line. The manifold may further comprises a fourth line extending from the center of the manifold, with the fourth line having a fourth valve disposed therein. The system may further comprise sensor means, operatively associated with a secondary pan, for measuring the level of condensation within the secondary pan and activating an alarm once a predetermined level is reached. A method of cleaning a condensate drain line is also disclosed.

One potential drawback with all three of these approaches is that manual actions, in some cases requiring special skills or knowledge, seem to be needed to remove the material from the condensate drain line.

BRIEF DESCRIPTION OF THE SEVERAL VIEWS OF THE DRAWINGS

The invention may best be understood by referring to the following description and accompanying drawings that are used to illustrate embodiments of the invention. In the drawings.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure the understanding of this description.

Figure 1:
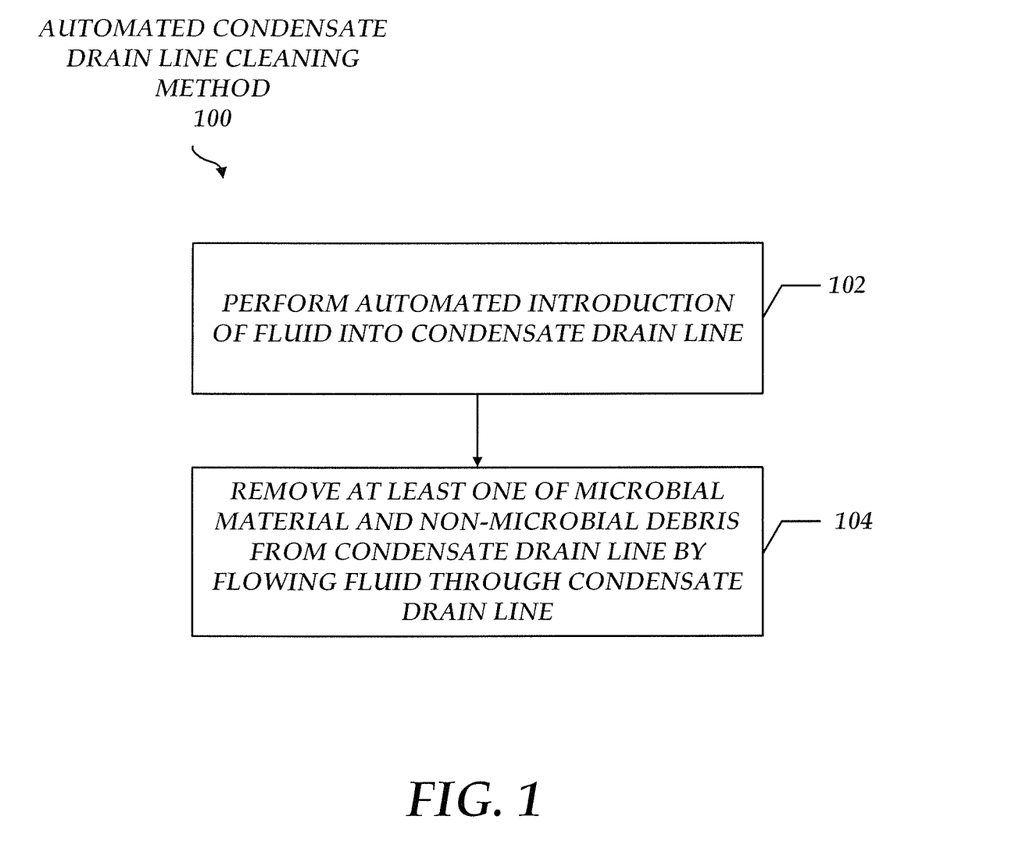
FIG. 1 is a block flow diagram of an automated condensate drain line cleaning method, according to embodiments of the invention.

FIG. 1 is a block flow diagram of an automated condensate drain line cleaning method 100, according to embodiments of the invention.

The method includes performing an automated introduction of a fluid into the condensate drain line, at block 102. As used herein, the term fluid may include a liquid (e.g., water), gas (e.g., air), or a combination of liquid and gas.

By automated it is meant that the introduction of the fluid into the condensate drain line includes at least one device (e.g., a controller) controlling at least one other device (e.g., at least one fluid flow regulation device). For example, performing the automated introduction of the fluid may involve the controller providing at least one control signal to the at least one fluid flow regulation device to cause the at least one fluid flow regulation device to introduce the fluid into the condensate drain line. The automation implies something more than purely human or manual control or actions, although it is to be understood that some actions or operations may be manual, such as, for example, a user pushing a button coupled with the controller or otherwise initiating the automated introduction of the fluid.

Then, at least one of microbial material and non-microbial debris may be removed from the condensate drain line by flowing the fluid through the condensate drain line, at block 104. The non-microbial debris may include dust, dirt, rust, or the like, or a combination thereof. By way of example, the microbial material and/or non-microbial debris may be removed to a sewer line, an outside location, a bucket, or other suitable destination.

Advantageously, such a method may help to remove material from the condensate drain line. This may help to prevent, or at least reduce, the likelihood, of condensate overflow and its associated damage. Accordingly, this method aims to provide a preventative solution that may help to prevent property damage from occurring.

Furthermore, the automated introduction of a fluid into the condensate drain line may help to reduce the involvement and/or technical knowledge requirements of the user. Indeed, in some embodiments the level of automation may be such that the user may barely even need to be aware of the operation of the automated condensate drain line cleaning system, or that the condensate drain pan could even overflow.

Figure 2:
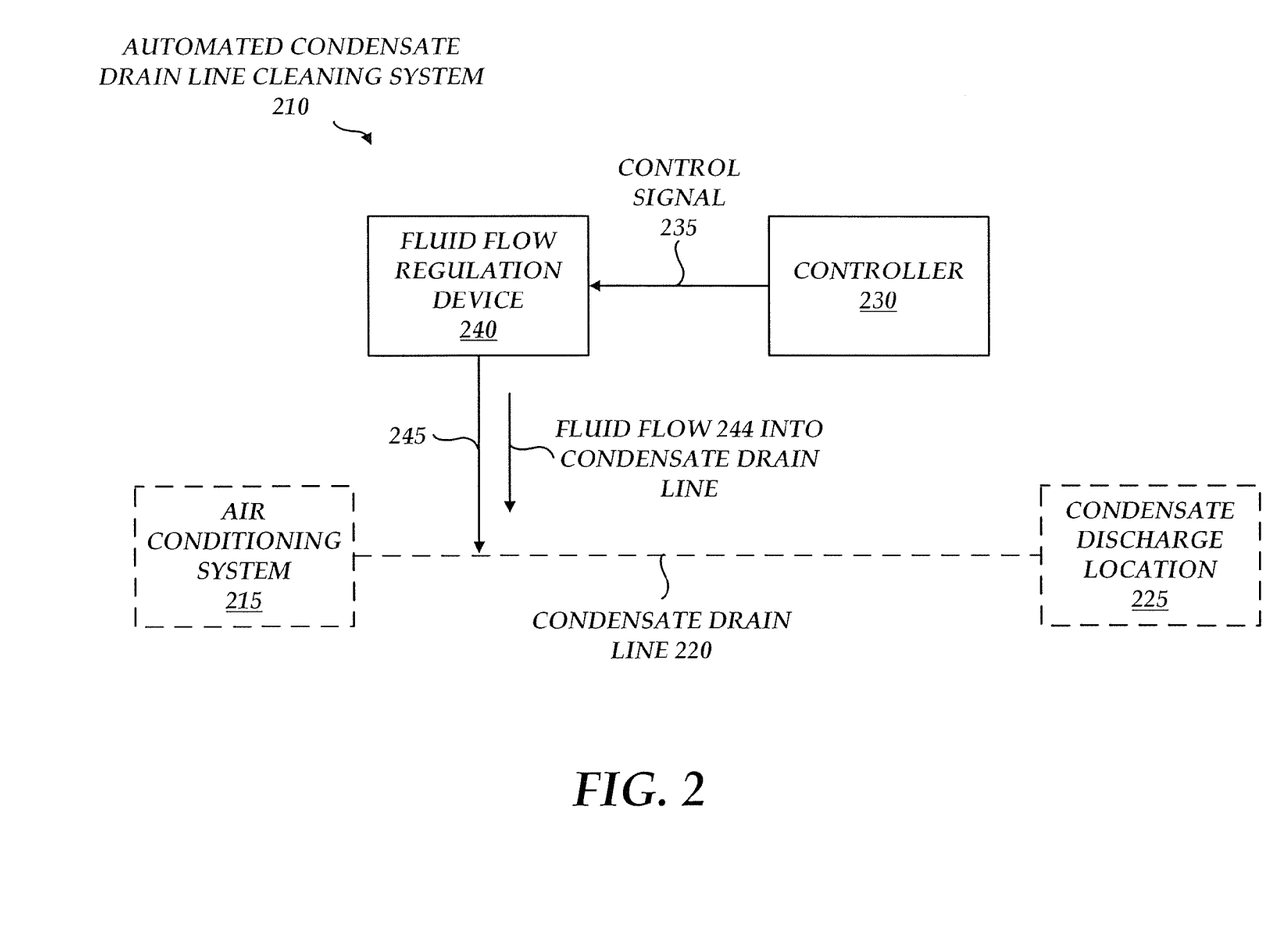
FIG. 2 is a block diagram of an automated condensate drain line cleaning system, according to embodiments of the invention.

FIG. 2 is a block diagram of an automated condensate drain line cleaning system 210, according to embodiments of the invention.

An air conditioning system 215, a condensate drain line 220, and a condensate discharge location 225 (e.g., a sewer, outside location, bucket, or the like) are shown. These components are shown in this figure to illustrate the coupling of the automated condensate drain line cleaning system. However, these components are shown in dashed lines to indicate that they are generally not a part of the automated condensate drain line cleaning system.

The automated condensate drain line cleaning system 210 includes a controller 230, a fluid supply line 245, and at least one fluid flow regulation device 240. The controller may be implemented in hardware (e.g., a circuit or integrated circuit), software (e.g., instructions executable by a general-purpose processor or computer), firmware, or a combination thereof. The controller may receive power from the air conditioning system, an outlet, a communication link, a battery, or the like. The at least one fluid flow regulation device 240 is electrically coupled with the controller 230 to receive at least one control signal 235 from the controller 230. The at least one fluid flow regulation device 240 is operable to cause a fluid flow 244 into the condensate drain line 220 through the fluid supply line 245 responsive to the at least one control signal 235.

One specific example of a controller that is suitable, or that at least may be adapted for suitability, for one or more embodiments of the invention, is the Millenium II Code 88950024 controller, which is commercially available from Crouzet, of Coppell, Tex., USA. Alternatively, field-programmable gate arrays (FPGAs) or other off-the-shelf programmable controllers may optionally be used. Note that off-the-shelf suitable FPGAs are commercially available from various sources and can be programmed for a specific application. There are even companies that can be hired to help in the programming of FPGAs for specific applications. As another option, a general-purpose processor capable of executing software may be used as the controller.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

Figure 3A:
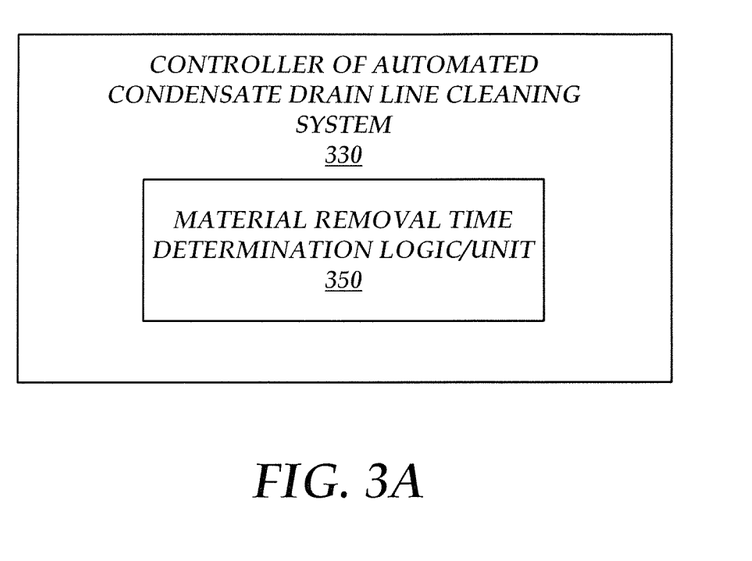
FIG. 3A is a block diagram of a controller of an automated condensate drain line cleaning system, the controller having cleaning time determination logic, according to embodiments of the invention.
Figure 3B:
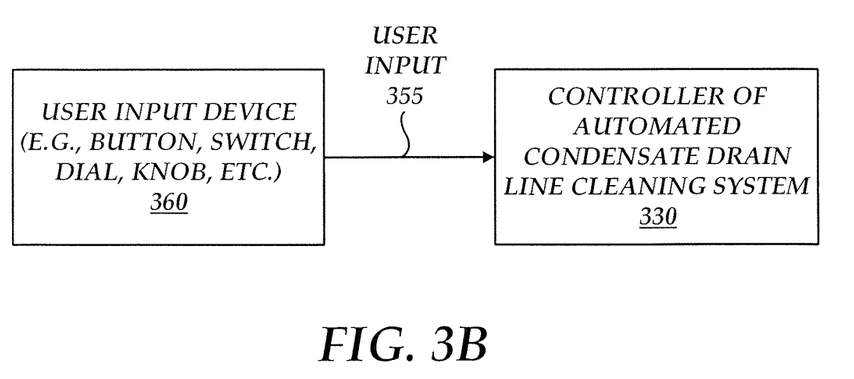
FIG. 3B is a block diagram of a user input device electrically coupled with, or otherwise in communication with, a controller of an automated condensate drain line cleaning system to provide user input to activate an automated cleaning, according to embodiments of the invention.

There are different approaches for activating or initiating the automated condensate drain line cleaning system and method. FIG. 3A illustrates one approach. FIG. 3B illustrates another approach.

FIG. 3A is a block diagram of a controller 330 of an automated condensate drain line cleaning system, according to embodiments of the invention. The controller has a material removal time and/or cleaning time determination logic and/or unit 350. The material removal time determination logic and/or unit may perform a determination or automated determination of a time to perform the automated introduction of the fluid into the condensate drain line.

There are literally numerous different ways in which the controller may determine the time to flush the drain line. To further illustrate certain concepts, a few illustrative ways will be discussed further below, although other ways will be apparent to those skilled in the art and having the benefit of the present disclosure.

In one or more embodiments of the invention, the material removal time determination logic and/or unit may determine the time based on at least one of: (1) a calendar; (2) a clock; (3) a counter; (4) a sensor; and (5) information received from an external electrical device or system. Let's consider several illustrative examples of how these may be used to determine the time.

Calendar: As one example, the controller may determine that it is time based on the calendar day being a given day (e.g., June 21). As another example, the controller may determine that it is time based on the calendar day being a given day of the month (e.g., the first day).

Clock: As one example, the controller may determine that it is time based on a clock counting a given amount of time since a last introduction of fluid into the condensate drain line. As another example, the controller may determine that it is time based on a clock counting to a given amount of air conditioner operating time since the last introduction.

Counter: As another example, the controller may determine that it is time based on a counter counting to a given number of air conditioner on-off cycles since a last introduction.

Sensor: As another example, the controller may determine that it is time based on a sensed level of condensate in a condensate drain pan as input from a sensor. As another example, the controller may determine that it is time based on a sensed differential pressure across a filter for the air conditioner either from the sensor directly or through a thermostat that is coupled with the actual sensor. As yet another example, the controller may determine that it is time based on a sensed humidity and/or outside temperature.

Information from External Device or System as input to controller: As another example, the controller may determine that it is time based on information received from a thermostat (e.g., a monitored filter differential pressure or filter change interval). As another example, the controller may determine that it is time based on information received from a network (e.g., an internet weather station, networked air conditioning monitoring computer system, or other networked computer system). The controller may have, or be coupled with, a connection interface to the network. As yet another example, the controller may determine that it is time based on information received from an external control system (e.g., a home control system or control system similar to that used to control lights in homes).

In one or more embodiments of the invention, the controller may allow a user to provide user specified configuration information that is operable to affect how the controller determines the time. For example, the controller may allow the user to specify a calendar date, clock value, counter value, sensor value, or other information, which it may use to determine the time. The controller may also optionally allow the user to provide a frequency factor, such as, for example, very often, often, sometimes, infrequently, and disabled, which may modulate how the controller determines the times. Advantageously, this may allow the user to have the automated condensate drain line cleaning system clean the line frequently, less frequently, or completely disable the automated condensate drain line cleaning system, depending upon time of year, environmental factors, personal preference, etc.

A few illustrative examples have been described, although the scope of the invention certainly is not limited to these specific examples. Those skilled in the art and having the benefit of the present disclosure appreciate that there are various other ways and criteria for determining the time. For example, the time may be determined based on a combination of the ways or criteria mentioned above. If desired, equations, calibration data, or even detailed models may optionally be used to provide additional sophistication in estimating the desired time to clean the line.

One potential advantage of the aforementioned approach is that the user need not be involved or need only be involved on a limited basis. However, another approach for activating or initiating the automated condensate drain line cleaning system and method is based on user input. This may help to simplify the logic of the controller and generally also the cost.

FIG. 3B is a block diagram of a user input device 360 electrically coupled with, or otherwise in communication with, a controller 330 of an automated condensate drain line cleaning system, according to embodiments of the invention. By way of example, the user input device may include at least one button, at least one switch, at least one dial, at least one knob, a touch screen, or at least one other user input device known in the art. The user input device may be on a thermostat, near a thermostat, on the air conditioner (e.g., near the air conditioner filter), proximate the air conditioner, or on the controller, to name just a few illustrative examples.

The user input device may allow a user to activate or initiate the automated condensate drain line cleaning system and method. For example, the automated introduction of the fluid into the condensate drain line may be performed responsive to a user pushing at least one button, flipping at least one switch, turning at least one knob, or turning at least one dial. Responsive to the user performing at least one of such operations, the user input device may provide user input 355 to the controller.

Such user input may cause the controller to provide at least one control signal to at least one fluid flow regulation device. As previously discussed, this may activate or initiate the automated introduction of the fluid into the condensate drain line. In one or more embodiments of the invention, the controller may optionally have a button, switch, knob, dial, setting, or other mechanism to allow a user to disable the system when they don't want it to operate automatically.

One potential drawback to this approach is that the user may need to remember to initiate the cleaning. As another option, the controller may be controlled to initiate the process by an external system, such as, for example, a thermostat, a home control system, a computer system coupled by a local area network (e.g., a personal computer system used for home control and/or monitoring), and a computer system coupled through the Internet (e.g., an Internet weather station and/or server responsible for monitoring the air conditioning system).

In one or more embodiments of the invention, the controller may include logic to wait for at least one criteria to be satisfied before causing the fluid to flow into the condensate drain line. In other words, after determining that it is time to perform the automated introduction of the fluid into the condensate drain line, the controller may wait for at least one criteria to be satisfied before performing the automated introduction of the fluid into the condensate drain line. Since the cleaning may be performed in a preventative way, instead of on an urgent need when the problem of spillage is eminent or has already occurred, there is the possibility for delay.

Various different criteria are contemplated. For example, if the determined time to perform the automated introduction of the fluid is late at night (e.g., after 9:00 PM), then controller may wait until morning (e.g., after 9:00 AM). Advantageously, this sort of controller intelligence may help to avoid noise during the middle of the night that may wake the residents.

As another example, if the determined time is during a conventional or configured time for eating dinner, then the controller may wait a given amount of time (e.g., two hours) before performing the automated introduction of the fluid. Advantageously, this also may help to avoid noise that may disrupt the dinner.

As yet another example, if the controller determines that the air conditioning system is currently running, then the controller may wait until the air conditioner shuts off. This may allow the condensate drain line to remain open while condensate is being produced by the running air conditioning system. Additionally, this may help to reduce the chances that water inside the condensate drain line may back flow into the condensate drain pan in the event that there is a negative pressure between the condensate drain line discharge (e.g., at the sewer or outside location) and the inside of the air conditioner. This delay would provide an opportunity for the water in the condensate drain line to drain to the sewer before the cleaning operation occurred.

In some cases, it may be appropriate for the controller to have the capability to communicate with an external system. That system may be associated with the cleaning process and/or monitoring of the cleaning process. Examples of suitable systems include, but are not limited to, thermostats, home control systems, computer systems coupled by a local area network (e.g., a personal computer system used for home control and/or monitoring), and computer systems coupled through the Internet (e.g., an Internet weather station and/or server responsible for monitoring the air conditioning system).

In one or more embodiments of the invention, the controller may be electrically coupled with, or otherwise in communication with, the external system. Furthermore, in one or more embodiments, the controller may include logic to provide at least one signal to the external system.

The signal may provide different information in different embodiments. In one aspect, the signal may indicate that the controller just caused the fluid to flow into the condensate drain line. In another aspect, the signal may indicate a time when the controller will next cause the fluid to flow into the condensate drain line. In yet another aspect, the signal may indicate both pieces of information.

As one example, the thermostat may receive and display this information to a user so that the user may readily monitor the cleaning activity. As another example, the home or networked monitoring system may receive and retain this information so that the user, another person, or software, may monitor the cleaning activity.

Figure 4:
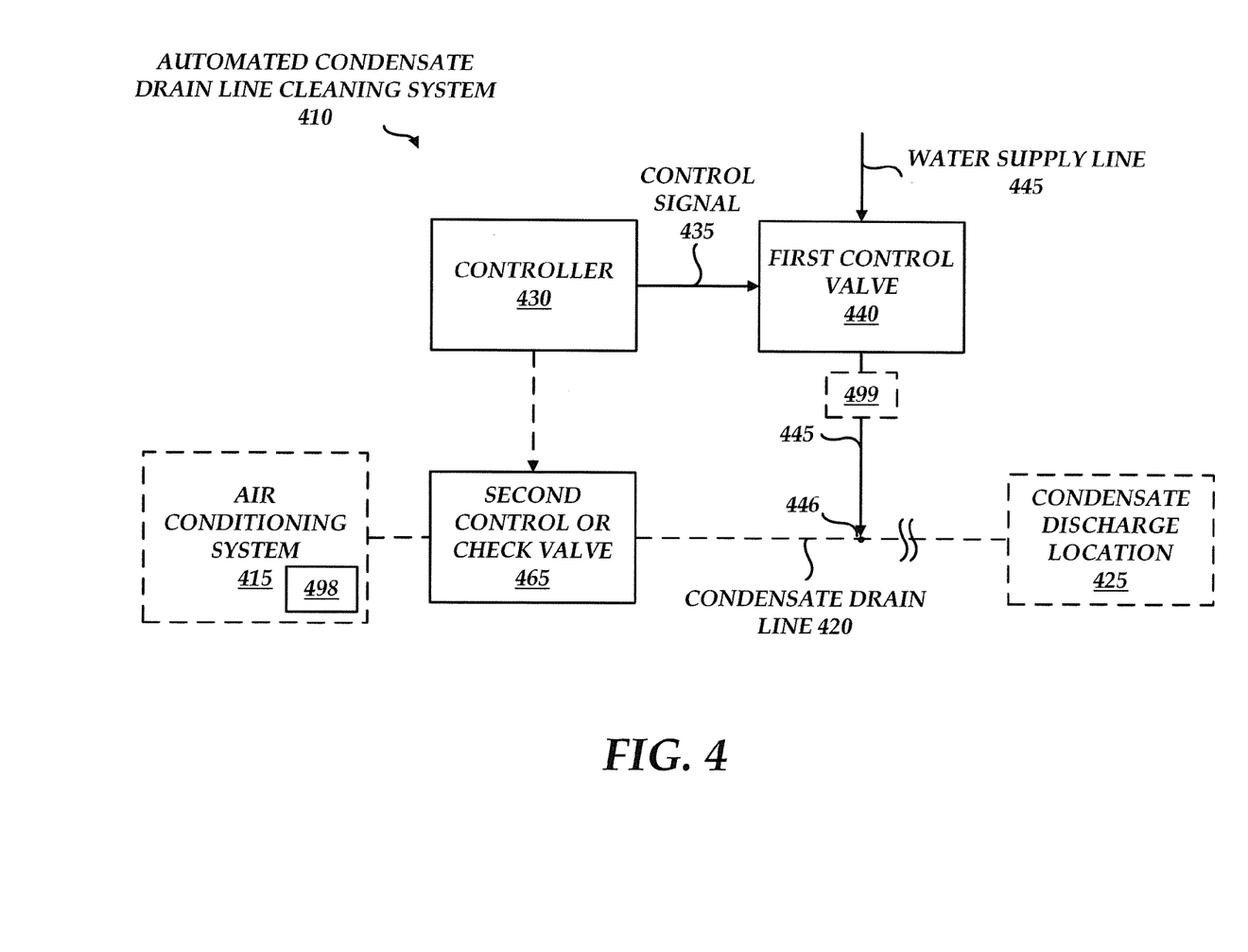
FIG. 4 is a block diagram of an automated condensate drain line cleaning system, according to first embodiments of the invention.
Figure 5:
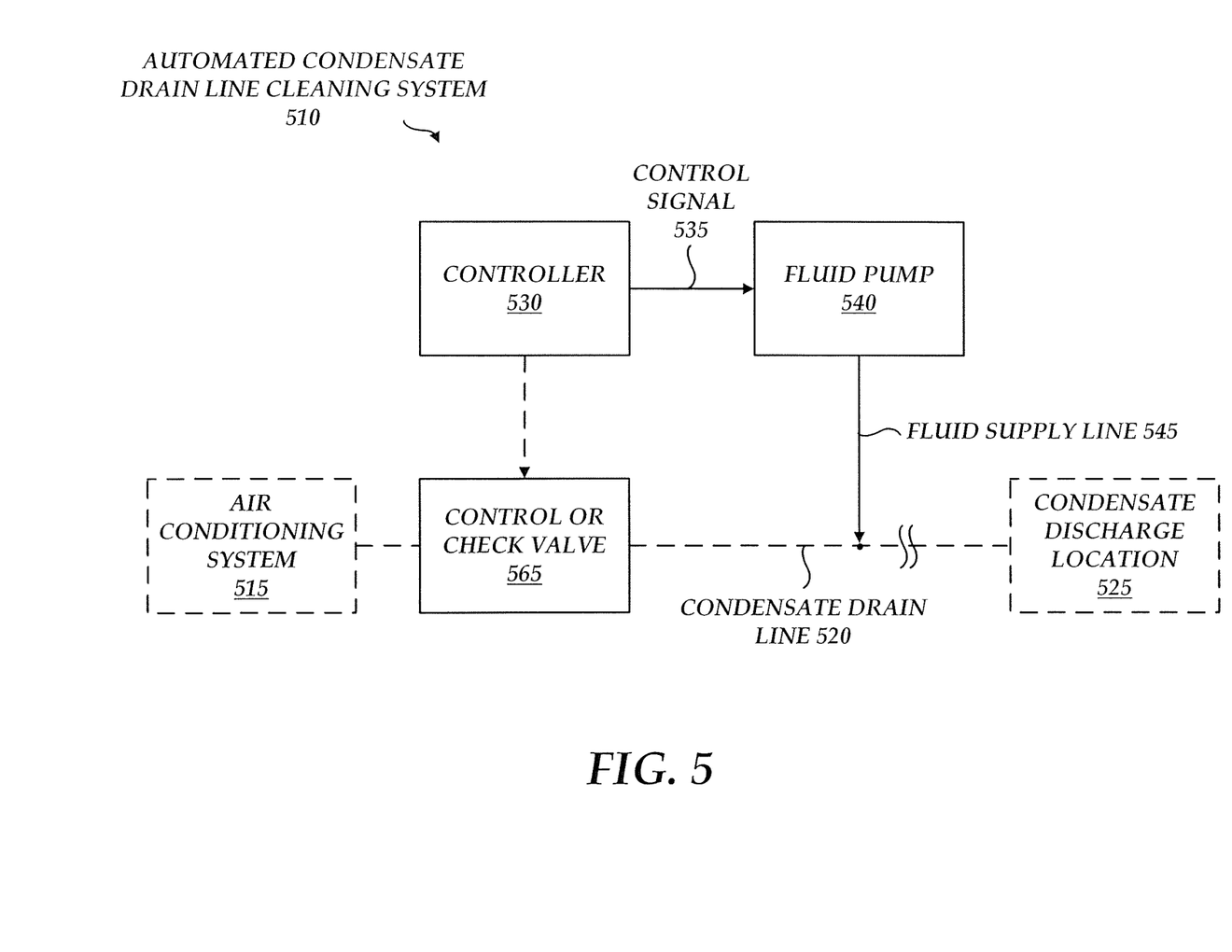
FIG. 5 is a block diagram of an automated condensate drain line cleaning system, according to second embodiments of the invention.
Figure 6:
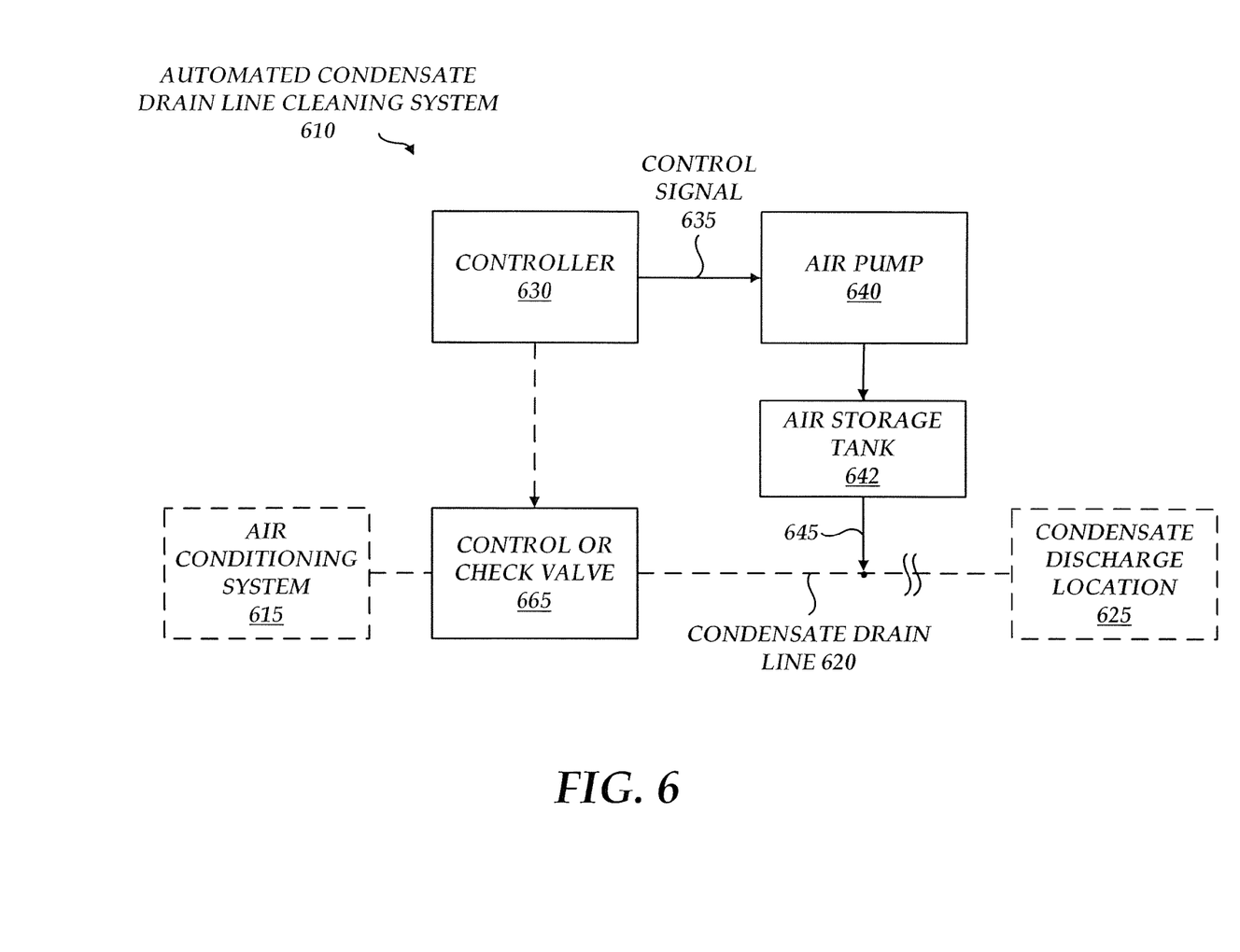
FIG. 6 is a block diagram of an automated condensate drain line cleaning system, according to third embodiments of the invention.

Now, the generalized automated condensate drain line cleaning system 210 of FIG. 2 may be implemented in various different ways. FIGS. 4-6 provide several illustrative examples. Each of these are examples of different automated means for removing microbial buildup from said at least the portion of the condensate drain line.

FIG. 4 is a block diagram of an automated condensate drain line cleaning system 410, according to first embodiments of the invention.

The automated condensate drain line cleaning system includes a controller 430, a water supply line 445, a first water supply line control valve 440, and a second control or check valve 465. As before, an air conditioning system 415, a condensate drain line 420, and a condensate discharge location 425 are shown to illustrate the coupling of the automated condensate drain line cleaning system. However, these components are shown in dashed lines to indicate that they are generally not a part of the automated condensate drain line cleaning system. The line coupling the controller 430 with the second control or check valve 465 is dashed to indicate that it is optional, for example, it may be omitted in the case of a check valve.

The controller may be as previously described. The controller is electrically coupled with the first water supply line control valve. By way of example, the valve may represent any of various types of mechanical devices capable of starting, substantially stopping, adjusting in degrees, or otherwise regulating by a movable part or portion that opens, partially opens, closes, partially closes, or partially obstructs, a fluid passageway. In one aspect, the second valve 465 may either be a control valve or a check valve. If the second valve is a control valve then it may also be electrically coupled with the controller (as shown by the dashed line), whereas if the second valve is a check valve it need not be electrically coupled with the controller.

The first water supply line control valve is in-line on the water supply line. The water supply line may supply water from a sufficiently pressurized source of water. By way of example, the water supply line may be a line, such as, for example, a section of hose or PVC pipe, leading from a standard faucet, spigot, or other source of pressurized municipal or household water.

The section of the water supply line leading from the outlet of the first water supply line control valve is fluidically coupled with the condensate drain line at a point 446. By way of example, the condensate drain line may be tapped into or cut and a T-fitting inserted. Generally, that point is close to the air conditioning system, such as, for example, within a foot or several feet. This may help to promote cleaning of a majority of the condensate drain line.

In operation, the controller may provide at least one control signal 435 to the first water supply line control valve in-line on the water supply line. The at least one control signal may cause the first water supply line control valve to at least partially open. This may cause water from the water supply line to flow or be introduced into the condensate drain line through the water supply line. The valve may potentially limit the flow to help to avoid damaging the condensate drain line, or as discussed further below a flow restriction and/or pressure reduction device 499 may optionally be included. Accordingly, the first water supply line control valve is an example of a fluid flow regulation device. The first water supply line control valve may admit water to the condensate drain line only when the controller controls it to do so.

The water introduced into the condensate drain line may have a significantly higher flow rate than the typical flow rate of the condensate through the line. The water may help to remove or flush at least some of the microbial material and/or non-microbial debris from the condensate drain line. This may help to unclog or un-restrict the condensate drain line. Advantageously, this may help to allow the flow of condensate from the drain pan to resume, which may advantageously help to avoid spillage and the associated property damage.

Now, it is generally desirable to prevent the water introduced through the water supply line from flowing into the drain pan of the air conditioning system, which could potentially result in overflow. Recall that the automated condensate drain line cleaning system includes the second control or check valve 465. The second valve is in-line on the condensate drain line and is disposed between a drain pan 498 of the air conditioning system 415 and the point 446 where the water is introduced into the condensate drain line from the water supply line. Generally, the second valve is close to the air conditioning system, such as, for example, within a foot or several feet.

If the second valve is a check valve, then the check valve may allow flow in a direction leading from the air conditioning system toward the condensate discharge location, but may prevent or at least significantly restrict flow in the opposite direction. Examples of suitable check valves include, but are not limited to, standard check valves and the valve described in U.S. Patent Application Publication 2006/0042292. Alternatively, if the second valve is a control valve, then the controller may provide at least one control signal (shown in dashed lines) to the second control valve, either before or at about the same time as the at least one control signal is provided to the first valve, to cause the second control valve to close while the water flows into the condensate drain line. Alternatively, if there is sufficient gradient and/or if the water is introduced with sufficient velocity in the desired direction, then the second control or check valve may optionally be omitted.

The cleaning process may be allowed to proceed for a sufficient amount of time, typically ranging from several seconds to several minutes depending upon the pressures, flows, and frequency of cleaning. After the cleaning process, the controller may control the first water supply control valve to close to prevent further entrance of water into the condensate drain line. The controller may then control the second control valve to open to allow flow of condensate to resume to the discharge location. In one aspect, the controller may wait for a short delay, such as, for example, an the order of five seconds or more, to allow water in the condensate drain line to drain to the discharge location, to help ensure that it doesn't backflow into the drain pan.

FIG. 5 is a block diagram of an automated condensate drain line cleaning system 510, according to second embodiments of the invention.

The automated condensate drain line cleaning system includes a controller 530, a fluid pump 540, a fluid supply line 545, and a second control or check valve 565. Also shown are an air conditioning system 515, a condensate drain line 520, and a condensate discharge location 525.

Unless otherwise specified or readily apparent, the components of the condensate drain line cleaning system 510 of FIG. 5 may optionally have the characteristics of the correspondingly named components of the condensate drain line cleaning systems shown in FIGS. 2 and/or 4. To avoid obscuring certain concepts, the following description will focus primarily on the different and/or additional components and their characteristics.

The controller 530 is electrically coupled with the pump 540. By way of example, the pump may represent any of various types of mechanical devices capable of pumping, compressing, or otherwise enhancing the transfer of the fluid into the condensate drain line. In various aspects, the pump may be a gas pump (e.g., an air pump) or a liquid pump (e.g., a water pump). In the case of a water pump, the water pump may be coupled to receive input water from a condensate drain pan, a faucet or spigot, a bucket, or the like. It is to be appreciated that occasionally a liquid pump pumps a limited amount of a gas and vice versa. Accordingly, a pump is an example of a fluid flow regulation device.

In operation, at an appropriate time, the controller may provide at least one control signal 535 to the pump. The pump may operate responsive to the at least one control signal. In particular, the at least one control signal may cause the pump to pump the fluid into the condensate drain line through the fluid supply line.

As previously discussed, the fluid may help to remove or flush at least some of the microbial material and/or non-microbial debris from the condensate drain line. This may help to unclog or un-restrict the condensate drain line. Advantageously, this may help to allow the flow of condensate from the drain pan to resume, which may advantageously help to avoid spillage and the associated property damage.

In one or more embodiments of the invention, a fluid accumulation tank, such as for example, a pressurized cylinder, may be coupled with the discharge of the pump to accumulate or store fluid for later release into the condensate drain line. While this generally offers greater advantages for gases, it may be used for liquids if desired.

FIG. 6 is a block diagram of an automated condensate drain line cleaning system 610, according to third embodiments of the invention.

The automated condensate drain line cleaning system includes a controller 630, an air pump 640, an air storage tank 642, an air supply line 645, and a second control or check valve 665. Also shown are an air conditioning system 615, a condensate drain line 620, and a condensate discharge location 625.

Unless otherwise specified or readily apparent, the components of the condensate drain line cleaning system 610 of FIG. 6 may optionally have the characteristics of the correspondingly named components of the condensate drain line cleaning systems shown in FIGS. 2 and/or 4-5. To avoid obscuring certain concepts, the following description will focus primarily on the different and/or additional components and their characteristics.

The controller 630 is electrically coupled with the air pump 640. In operation, at an appropriate time, the controller may provide at least one control signal 635 to the air pump. Various known types of air pumps are suitable including fans, blowers, and compressors. The air pump may operate responsive to the at least one control signal. In particular, the at least one control signal may cause the air pump to pump air into the air storage tank.

The air storage tank is coupled between the air pump and the condensate drain line. The air storage tank may accumulate and store the air. By way of example, the air storage tank may have a capacity ranging from about half a quart to about a gallon, or more, although this is not required. The air storage tank may include a pressurized cylinder or other pressure vessel. The pressure in the air storage tank may increase over time as more air is pumped into the air storage tank.

At some point, the controller may control the air pump to stop pumping air into the air storage tank. When it is time to clean the condensate line, the controller may control the air storage tank to discharge the stored and pressurized air into the condensate drain line. This pressurized air may help to clean the condensate drain line.

One potential advantage of the air pump and air storage tank is that they may be well suited for retrofitting an existing air conditioning system. There is no need to run a separate water supply line. Additionally, one potential advantage of the air storage tank is to help to allow a smaller and less expensive air pump to be used than would be needed if the air storage tank were not there. Alternatively, the air pump may be used without the air storage tank, or a pre-compressed air tank may optionally be used.

Since the flow through condensate drain lines is generally relatively low, the condensate drain lines and their couplings are not always designed to handle appreciable pressures and/or fluid flow rates. In some cases, it is contemplated that the fluid introduced into the condensate drain line by the automated condensate drain line cleaning system may have sufficient pressure and/or flow that it may potentially damage the condensate drain line, its couplings, and/or one or more other components downstream.

In one or more embodiments of the invention, the automated condensate drain line cleaning system, such as, for example, that shown in FIG. 2, 4, 5, 6, or 7 may include an optional flow restriction and/or pressure reduction device. The flow restriction and/or pressure reduction device may be operable to reduce the flow rate and/or the pressure of the fluid introduced into the condensate drain line and may be operable to prevent the fluid from damaging the condensate drain line or another component downstream from the flow restriction and/or pressure reduction device.

Examples of suitable flow restriction and/or pressure reduction devices include, but are not limited to, relatively small or constriction orifices, relatively small or constriction valves, relatively small or constriction sections of piping or line, constriction bends, and other relatively small and/or constriction devices and structures. These may either be incorporated into an existing flow regulation device (e.g., a solenoid or control valve) or may be separate. Examples of a suitable solenoid valves include those available from Gems Sensors & Controls, of Plainville, Conn., USA, some of which have a built in orifice. Such flow restriction and/or pressure reduction devices may be used with various of the automated condensate drain line cleaning systems disclosed herein.

In one or more embodiments of the invention, the automated condensate drain line cleaning system, such as, for example, that shown in FIG. 2, 4, 5, 6, or 7 may include an optional pressure sensor. Examples of suitable pressure sensors include, but are not limited to, small piezoelectric sensors. By way of example, the pressure sensor may be fluidically coupled after the fluid flow regulation device 240, first control valve 440, fluid pump 540, air storage tank 642. If an optional flow restriction and/or pressure reduction device is included, then the pressure sensor may optionally be after it. The pressure sensor may be electrically or logically coupled with, or in communication with, the controller to provide a sensed pressure to the controller. The controller may control the control valve, pump, or other controlled device based at least in part on the sensed pressure. In one aspect, the controller may use the sensed pressure as feedback to control the valve, pump, or other controlled device. As one example, the controller may adjust the valve, pump, or other controlled device, based on the sensed pressure to help to achieve a predetermined, given, or sufficient pressure. For example, the controller may further open the valve or increase the output of the pump if the sensed pressure is too low (e.g., lower than a threshold). Advantageously, this may help to improve cleaning. As another example, the controller may at least partially close the valve or at least partially reduce the output of the pump if the sensed pressure is too high (e.g., higher than a threshold), which may potentially indicate that the discharge line is blocked. The controller may also potentially interrupt the cleaning operations and/or issue an alarm (e.g., a piezoelectric warning buzzer) so that corrective actions may be taken. Advantageously, this may help to avoid system damage and/or leakage.

The utility of the automated condensate drain line cleaning systems and methods disclosed herein are not limited to use in home or business air conditioning systems but are more widely applicable to other environments having air conditioning systems. One notable example is in vehicles.

Figure 7:
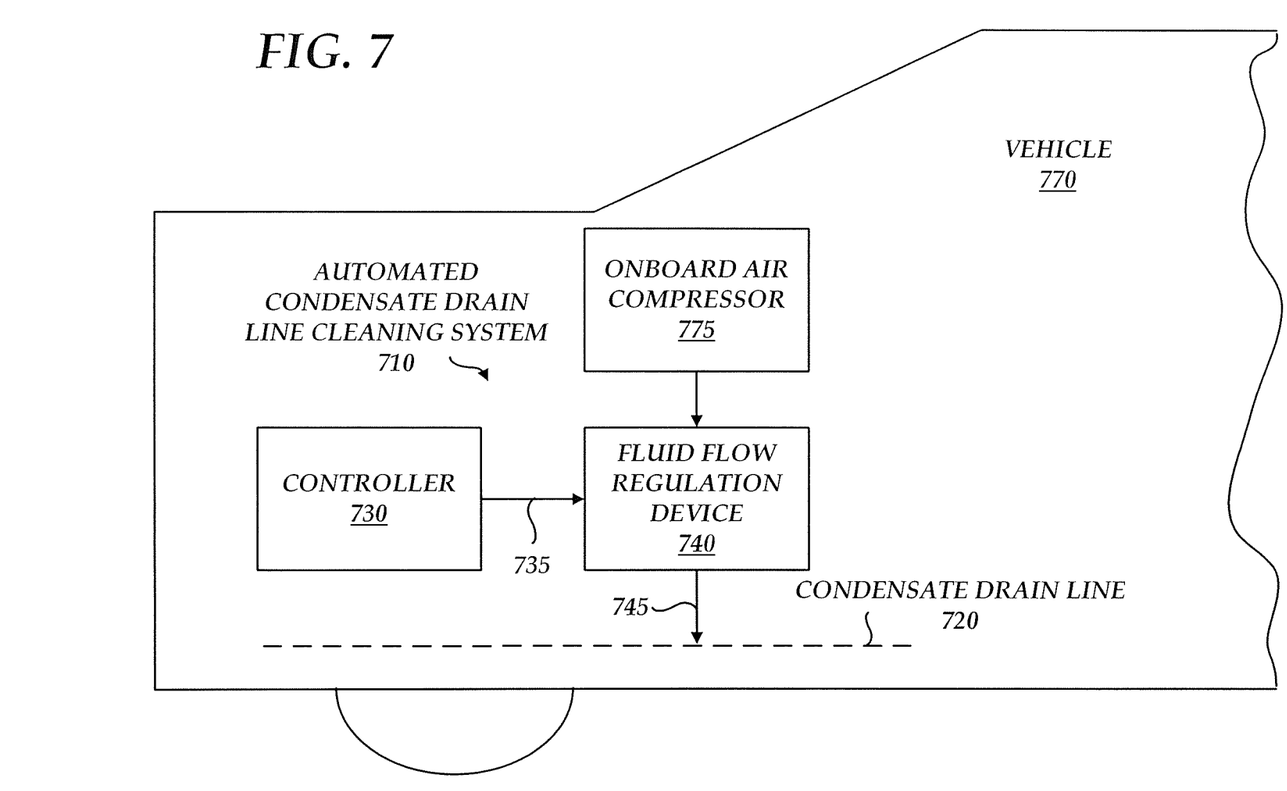
FIG. 7 is a block diagram of a vehicle having an automated condensate drain line cleaning system, according to embodiments of the invention.

FIG. 7 is a block diagram of a vehicle 770 having an automated condensate drain line cleaning system 710, according to embodiments of the invention.

By way of example, the vehicle may be a car, a truck, a motorcycle, industrial vehicle (e.g., dump truck or garbage truck), airplane, tank, or the like. The vehicle has an onboard air compressor and a condensate drain line. These components are shown in dashed lines to indicate that they are not necessarily part of the automated condensate drain line cleaning system. Rather, these components may be conventional components found in vehicles.

The automated condensate drain line cleaning system includes a controller 730 and at least one fluid flow regulation device 740, such as, for example, a control valve. The automated condensate drain line cleaning system is coupled with and/or attached to the vehicle.

The fluid flow regulation device is coupled to allow compressed air from the onboard air compressor of the vehicle to flow or be introduced into the condensate drain line through a fluid supply line responsive to at least one control signal from the controller. In particular, the fluid flow regulation device has an input that is fluidically coupled with an output of the onboard air compressor. An output of the fluid flow regulation device is fluidically coupled with the condensate drain line through a fluid supply line 745. The controller is electrically coupled with the fluid flow regulation device to provide the at least one control signal 735 to cause the automated introduction of the compressed air. The controller may be electrically coupled with the electrical system of the vehicle, or it may have its own battery, to name a few examples.

In embodiments of the invention, the automated condensate drain line cleaning systems disclosed herein may be assembled or incorporated with new air conditioning systems in factories. It is hoped and believed that the automated condensate drain line cleaning systems disclosed herein will provide new functionalities that may help to encourage the sale of the air conditioning systems that incorporate them.

As another option, in other embodiments of the invention, components of the automated condensate drain line cleaning systems disclosed herein may be sold in various combinations as kits that may be installed on and/or used to retrofit a new and/or existing air conditioning system.

Figure 8:
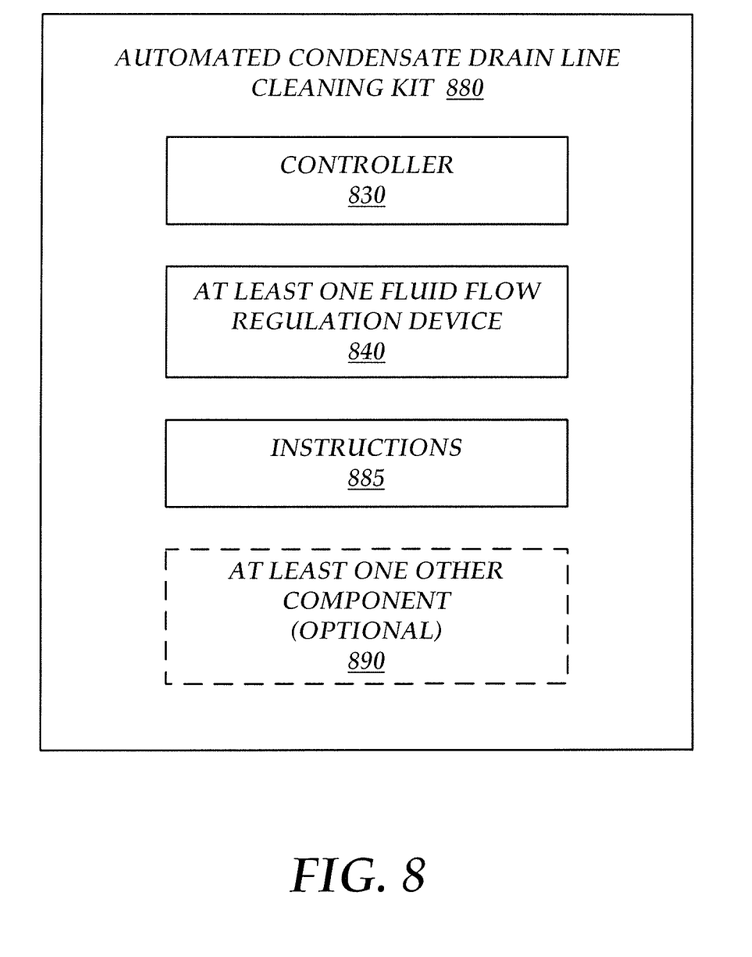
FIG. 8 is a block diagram of an automated condensate drain line cleaning kit, according to embodiments of the invention.

FIG. 8 is a block diagram of an automated condensate drain line cleaning kit 880, according to embodiments of the invention.

The kit includes a controller 830, at least one fluid flow regulation device 840, and instructions 885. The controllers and fluid flow regulation devices discussed elsewhere herein are suitable. The at least one fluid flow regulation device, such as, for example, one or more valves and/or pumps, may be capable of being electrically coupled with the controller.

The instructions may be paper instructions and/or instructions stored on a computer disk, compact disk, DVD, or other machine-readable medium. The instructions may explain how to assemble the kit to an air conditioning system and/or how to use the automated condensate drain line cleaning kit and system. By way of example, the instructions may include instructions to electrically couple the controller with the at least one fluid flow regulation device. The instructions may also include instructions to couple the at least one fluid flow regulation device with a condensate drain line through a path including a fluid supply line and potentially other components (e.g., in some cases a fluid storage tank). With this coupling, the at least one fluid flow regulation device may be operable to cause a fluid to flow into the condensate drain line responsive to at least one control signal received from the controller.

Referring again to FIG. 8, in one or more embodiments, the kit may include at least one other component 890. Examples of suitable other components include, but are not limited to, a fluid storage tank, an air storage tank, a flow restriction device, at least one user input device, a condensate drain line, an amount of a known antimicrobial agent to be applied to the condensate drain line, and combinations thereof.

In the description above, for the purposes of explanation, numerous specific details have been set forth in order to provide a thorough understanding of the embodiments of the invention. It will be apparent however, to one skilled in the art, that one or more other embodiments may be practiced without some of these specific details. The particular embodiments described are not provided to limit the invention but to illustrate it. The scope of the invention is not to be determined by the specific examples provided above but only by the claims below. In other instances, well-known circuits, structures, devices, and operations have been shown in block diagram form or without detail in order to avoid obscuring the understanding of the description. All equivalent relationships to those illustrated in the drawings and described in the specification are encompassed within embodiments of the invention.

Various operations and methods have been described. Some of the methods have been described in a basic form, but operations may optionally be added to and/or removed from the methods. The operations of the methods may also often optionally be performed in different order. Many modifications and adaptations may be made to the methods and are contemplated.

Certain operations may be performed by hardware components, or may be embodied in machine-executable instructions, that may be used to cause, or at least result in, a circuit programmed with the instructions performing the operations. The circuit may include a general-purpose or special-purpose processor, or logic circuit, to name just a few examples. The operations may also optionally be performed by a combination of hardware and software.

One or more embodiments of the invention may be provided as a program product or other article of manufacture that may include a machine-accessible and/or readable medium having stored thereon one or more instructions and/or data structures. The medium may provide instructions, which, if executed by a machine, may result in and/or cause the machine to perform one or more of the operations or methods disclosed herein.

For clarity, in the claims, any element that does not explicitly state "means for" performing a specified function, or "step for" performing a specified function, is not to be interpreted as a "means" or "step" clause as specified in 35 U.S.C. Section 112, Paragraph 6. In particular, any potential use of "step of" in the claims herein is not intended to invoke the provisions of 35 U.S.C. Section 112, Paragraph 6.

It should also be appreciated that reference throughout this specification to "one embodiment", "an embodiment", or "one or more embodiments", for example, means that a particular feature may be included in the practice of the invention. Similarly, it should be appreciated that in the description various features are sometimes grouped together in a single embodiment, Figure, or description thereof for the purpose of streamlining the disclosure and aiding in the understanding of various inventive aspects. This method of disclosure, however, is not to be interpreted as reflecting an intention that the invention requires more features than are expressly recited in each claim. Rather, as the following claims reflect, inventive aspects may lie in less than all features of a single disclosed embodiment. Thus, the claims following the Detailed Description are hereby expressly incorporated into this Detailed Description, with each claim standing on its own as a separate embodiment of the invention.

What is claimed is:

1. A method comprising:
    performing an automated introduction of a fluid into a condensate drain line, wherein performing the automated introduction of the fluid into the condensate drain line comprises providing at least one control signal to at least one fluid flow regulation device, wherein providing the at least one control signal to the at least one fluid flow regulation device comprises providing at least one control signal to a first control valve to cause the first control valve to at least partially open to introduce the fluid into the condensate drain line, wherein providing the at least one control signal to the first control valve comprises providing the at least one control signal to a water supply control valve that is in-line on a water supply line to cause the water supply control valve to at least partially open to introduce water into the condensate drain line, wherein introducing the water into the condensate drain line comprises flowing the water through a flow restriction device that is operable to prevent the water from the water supply line from damaging a component downstream from the flow restriction device; and
    removing at least one of microbial material and non-microbial debris from the condensate drain line by flowing the fluid through the condensate drain line.

2. The method of claim 1, wherein providing the at least one control signal to the water supply control valve comprises providing the at least one control signal to the water supply control valve that is in-line on a water supply line coupled with a source of pressurized municipal water.

3. The method of claim 1, wherein flowing the water through the flow restriction device comprises flowing the water through a constriction valve.

4. The method of claim 1, wherein flowing the water through the flow restriction device comprises flowing the water through a constriction orifice.

5. The method of claim 1, further comprising, prior to performing the automated introduction of the fluid, sensing a pressure, and wherein the at least one control signal that is provided to the first control valve is based on the sensed pressure.

6. A method comprising:
    performing an automated introduction of a fluid into a condensate drain line, wherein performing the automated introduction of the fluid into the condensate drain line comprises providing at least one control signal to at least one fluid flow regulation device, wherein providing the at least one control signal to the at least one fluid flow regulation device comprises providing at least one control signal to a pump to cause the pump to pump the fluid into one selected from the condensate drain line and a storage tank coupled between the pump and the condensate drain line, and wherein providing the at least one control signal to the pump comprises providing the at least one control signal to an air pump to cause the air pump to pump air into an air storage tank coupled between the air pump and the condensate drain line; and removing at least one of microbial material and non-microbial debris from the condensate drain line by flowing the fluid through the condensate drain line.

7. The method of claim 6, wherein providing the at least one control signal to the air pump is to cause the air pump to pump air into the air storage tank which comprises a pressurized cylinder.

8. The method of claim 6, wherein providing the at least one control signal to the air pump comprises providing the at least one control signal to a compressor.

9. The method of claim 6, wherein providing the at least one control signal to the air pump causes the air pump to pump the air into the air storage tank having a volume ranging from a half a quart to a gallon.

10. The method of claim 6, further comprising sensing a pressure, and wherein providing the at least one control signal to the air pump comprises providing the at least one control signal to the air pump based on the sensed pressure.

\* \* \* \* \*